3,131,216
PROCESS FOR THE MANUFACTURE OF PURE l(+)-LYSINE
Gisela Buck-Hansen, Chur, Switzerland, assignor to Inventa A.G. fur Forschung und Patentverwertung, Zurich, Switzerland
No Drawing. Filed Apr. 11, 1961, Ser. No. 102,095
5 Claims. (Cl. 260—534)

The invention relates to a process for the manufacture of l(+)-lysine and, more particularly, to such a product having a purity of more than 99 percent.

In the synthesis of lysine, a racemate is obtained, i.e., a product consisting of equal parts of the biologically active l(+)-isomers and of the biologically inactive d(−)-isomers. These two stereoisomeric forms can be separated by the fractionation of their glutamates (see U.S. 2,556,907). From the glutamates, the free amino acids are obtained, i.e., l(+)-lysine and d(−)-lysine, for instance by a treatment with ion exchangers. The l(+)-form, in aqueous solution, is treated with an equimolar amount of HCl. By evaporation, l(+)-lysine monohydrochloride can be obtained which is sold as such, provided it has the required purity.

However, it is an established fact that the l(+)-lysine monohydrochloride thus obtained does not always possess a purity of more than 99 percent, as required for sales, but that it contains varying amounts of d,l-lysine monohydrochloride. This disadvantage is based primarily on the insufficient purity of the l(+)-lysine glutamate, obtained as an intermediate product, and it has been proposed to recrystallize this glutamate. However, this recrystallization requires considerable time and considerable amounts of solvents, hence, is uneconomical. According to another suggestion (see U.S. 2,556,917), the mixture of crystals consisting of impure l(+)-lysine monohydrochloride-dihydrate and d,l-lysine monohydrochloride from the crystallization is separated mechanically, e.g., by sifting, since l(+)-lysine monohydrochloride as the dihydrate allegedly forms large crystals, whereas the d,l-lysine monohydrochloride, having no water of crystallization, is of very fine grain. This process has a number of technological drawbacks. First, l(+)-lysine monohydrochloride-dihydrate, naturally, also forms small crystals which cannot be retained during the separating operation. Secondly, the large crystals are prone to break during the mechanical treatment. Lastly, the dihydrate gradually loses water of crystallization upon standing in air, so that the crystals disintegrate.

These disadvantages are avoided by the purification and crystallization according to the instant invention. It has been established that l(+)-lysine monohydrochloride can be produced with an optical purity of more than 99 percent. This is accomplished in the following manner:

An unsaturated aqueous solution of l(+)-lysine monohydrochloride and d,l-lysine monohydrochloride, whose content of l(+)-lysine monohydrochloride corresponds to an optical purity of 80–99 percent, is evaporated to the saturating concentration of l(+)-lysine monohydrochloride at a saturating temperature lying below the evaporation temperature. The solution then is cooled to the saturating temperature and, during cooling, is seeded with d,l-lysine monohydrochloride. Afterward, the d,l-lysine monohydrochloride which had separated at the saturating temperature and which contains but little l(+)-lysine monohydrochloride, is filtered off the mother liquor, from which the l(+)-lysine monohydrochloride is obtained in a conventional manner.

The process according to the invention is based on the surprising and unexpected discovery that d,l-lysine monohydrochloride which, by itself, is readily soluble in water, remains practically undissolved in a saturated aqueous l(+)-lysine monohydrochloride solution. Solubility tests have shown that the three-phase system l(+)-lysine monohydrochloride, d,l-lysine monohydrochloride and $H_2O$, at 20 plus-minus 0.05° C., forms a solution of 38.1 percent by weight l(+)-lysine monohydrochloride having an optical purity of 99.2 percent.

This enables the manufacture of a very pure l(+)-lysine monohydrochloride, i.e., 99.2 to 100 percent.

When a solution containing l(+)-lysine monohydrochloride of an optical purity of, e.g., 85–90%, is concentrated to such an extent that the water present just suffices to form a saturated solution with the pure l(+)-lysine monohydrochloride present, the d,l-lysine monohydrochloride, together with a little l(+)-lysine monohydrochloride, precipitates at 20° C., if required, with the aid of seeding with d,l-lysine monohydrochloride, and the product remaining in solution has a purity of 99.2%. The mother liquor can then be upgraded, for instance through drying by atomization.

However, it is more opportune to concentrate the mother liquor to approximately one-half its volume, whereby l(+)-lysine monohydrochloride crystallizes in large and glass-clear crystals which have an optical purity of 100 percent. The d,l-lysine monohydrochloride still present in the solution does not precipitate owing to supersaturation.

Furthermore, it has been found to be a distinct advantage, especially when the l(+)-lysine monohydrochloride content of the solution corresponds to an optical purity above 95 percent, to deviate from the common practice of seeding with an arbitrary small amount of seeding crystals and to use, for seeding, crystals in amounts of 1–10 percent by weight, calculated on dissolved lysine monohydrochlorides.

The invention now will be further explained by the following examples. However, it should be understood that these are given merely by way of illustration, not of limitation, and that numerous changes may be made in the details without departing from the spirit and the scope of the invention as hereinafter claimed.

*Example 1*

402 g. l(+)-lysine monohydrochloride, having an optical purity of 92.4%, are dissolved in water. The solution is freed from discoloration with activated carbon and is filtered. The solution then is concentrated in vacuo at a temperature of 40–50° C. to a weight of 912 g., i.e., to a lysine monohydrochloride content of 44.1 percent by weight. The water then present corresponds to the quantity required to form a saturated solution of 40.04% by weight at 20° C. with the l(+)-lysine monohydrochloride present. The solution is allowed to cool gradually while stirring. At 30° C., seeding with approximately 0.5 g. d,l-lysine monohydrochloride is carried out, and the solution is filtered as soon as the temperature has reached 20° C. The precipitated lysine monohydrochloride has an optical purity of 56.0 percent.

The mother liquor then is concentrated to half its volume, whereafter, upon cooling, l(+)-lysine monohydrochloride crystallizes. Its weight, after drying, is 203 g., the optical purity 100 percent.

*Example 2*

To the mother liquor, prepared according to Example 1 and containing 112 g. l(+)-lysine monohydrochloride, 300 g. l(+)-lysine monohydrochloride of an optical purity of 89.8% are added. This is diluted with water and purified with activated carbon. The solution then is concentrated to 963 g., i.e., to a total lysine monohydrochloride content of 43.8 percent. The solution is allowed to cool gradually with agitation and, at 30° C., is seeded with d,l-lysine monohydrochloride and filtered after reaching a temperature of 20° C. The precipitated lysine monohydrochloride has an optical purity of 55.2 percent.

The mother liquor is concentrated to approximately one-half its volume. l(+)-lysine monohydrochloride crystallizes, is separated and dried. 251 g. of the product, free of water, are obtained having an optical purity of 100%.

*Example 3*

300 g. lysine monohydrochloride having a l(+)-lysine monohydrochloride content of 95 percent by weight are dissolved in water, and the solution is concentrated to a weight of 705 g., i.e., to a lysine monohydrochloride content of 43.5 percent by weight. The solution is allowed to cool with agitation, is seeded at 30° C. with 12 g. d,l-lysine monohydrochloride and is allowed to cool under continued steady agitation to 20° C. The lysine monohydrochloride then crystallized is filtered. The solution is concentrated to approximately half its volume, and l(+)-lysine monohydrochloride crystallized. Its weight, after drying, is 180 g., the optical purity 100 percent.

I claim as my invention:

1. A process for the manufacture of l(+)-lysine monhydrochloride having an optical purity of 99.2 to 100 percent, which comprises evaporating an unsaturated aqueous solution of l(+)-lysine monohydrochloride plus d,l-lysine monohydrochloride whose l(+)-lysine monohydrochloride content corresponds to an optical purity of 80 to 99 percent, at a temperature of 40–50° C. to the saturation concentration of l(+)-lysine monohydrochloride at 20° C.; cooling the solution to 30° C.; seeding the solution at that temperature with d,l-lysine monohydrochloride; cooling the solution to 20° C.; filtering off precipitated d,l-lysine monohydrochloride containing but little l(+)-lysine monohydrochloride; and separating the l(+)-lysine monohydrochloride remaining in the mother liquor therefrom.

2. The process as defined in claim 1, wherein the l(+)-lysine monohydrochloride is separated from the mother liquor by atomization drying.

3. The process as defined in claim 1, wherein the l(+)-lysine monohydrochloride is separated from the mother liquor by evaporation and crystallization.

4. A process for the manufacture of l(+)-lysine monohydrochloride having an optical purity of 99.2 to 100 percent, which comprises evaporating an unsaturated aqueous solution of l(+)-lysine monohydrochloride plus d,l-lysine monohydrochloride, whose l(+)-lysine monohydrochloride content corresponds to an optical purity of 80 to 99 percent, in vacuo at a temperature of 40 to 50° C. to the saturation concentration of l(+)-lysine monohydrochloride at 20° C.; cooling the solution to 30° C.; seeding the solution at that temperature with d,l-lysine monohydrochloride; cooling the solution to 20° C.; filtering off precipitated d,l-lysine monohydrochloride containing but little l(+)-lysine monohydrochloride; and separating and drying the l(+)-lysine monohydrochloride remaining in the mother liquor.

5. A process for the manufacture of l(+)-lysine monohydrochloride having an optical purity of 99.2 to 100 percent, which comprises evaporating an unsaturated aqueous solution of l(+)-lysine monohydrochloride plus d,l-lysine monohydrochloride, whose l(+)-lysine monohydrochloride content corresponds to an optical purity of 80 to 99 percent, in vacuo at a temperature of 40 to 50° C. to the saturation concentration of l(+)-lysine monohydrochloride at 20° C.; cooling the solution to 30° C.; seeding the solution at that temperature with 1 to 10 percent by weight d,l-lysine monohydrochloride, calculated on the total dissolved lysine monohydrochloride; cooling the solution to 20° C.; filtering off precipitated d,l-lysine monohydrochloride containing but little l(+)-lysine monohydrochloride; and separating and drying the l(+)-lysine monohydrochloride remaining in the mother liquor.

References Cited in the file of this patent
UNITED STATES PATENTS 2,556,917    Hambrock _____ June 12, 1951